United States Patent [19]

Weir

[11] Patent Number: 5,277,465
[45] Date of Patent: Jan. 11, 1994

[54] UNIVERSAL GRILL GUARD

[75] Inventor: Dennis E. Weir, Glendale, Ariz.

[73] Assignee: Quality S Manufacturing, Inc., Phoenix, Ariz.

[21] Appl. No.: 979,323

[22] Filed: Nov. 20, 1992

[51] Int. Cl.⁵ .............................................. B60R 19/00
[52] U.S. Cl. .................................... 293/142; 293/143; 293/144; 293/146; 280/762
[58] Field of Search ................ 293/146, 147, 148, 142, 293/143, 144; 280/762

[56] References Cited

U.S. PATENT DOCUMENTS

| | | | |
|---|---|---|---|
| 2,309,368 | 1/1943 | Walklet | 293/146 |
| 2,639,933 | 5/1953 | Meyer et al. | 293/146 |
| 4,168,855 | 9/1979 | Koch | 293/146 |
| 4,171,838 | 10/1979 | Grundy | 293/148 |

Primary Examiner—Robert R. Song
Attorney, Agent, or Firm—Cahill, Sutton & Thomas

[57] ABSTRACT

A grill guard which can be adapted to different vehicles includes a pair of horizontal tubes fastened to a pair of vertical side plates. The side plates are attached to the bumper of a vehicle by an L-shaped bracket attached to the lower end of each side plate, a triangular plate attached near the middle of each side plate, and an L-shaped bracket connecting each triangular plate to the bumper. Each side plate has a plurality of regularly shaped holes along the rear edge thereof for adjusting the vertical spacing of the triangular plate from the lower L-shaped bracket. A dog fastens the tubes to the side plates at each intersection thereof.

16 Claims, 2 Drawing Sheets

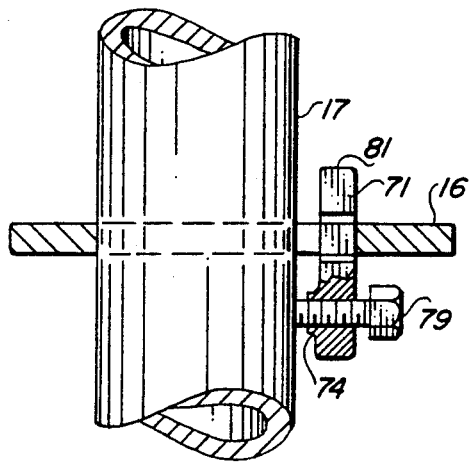
FIG-7
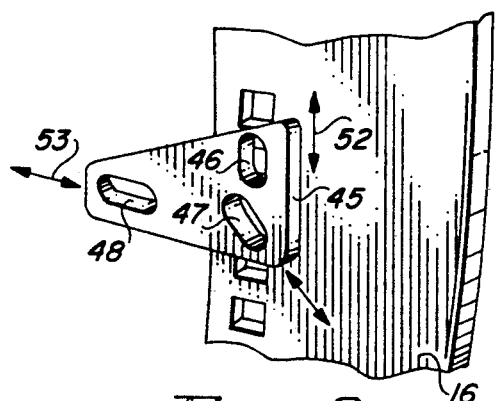
FIG-8
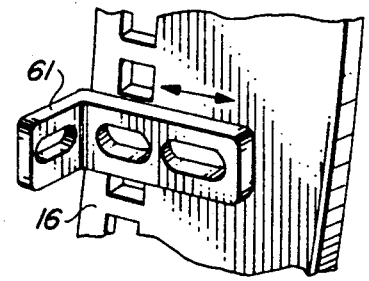
FIG-9
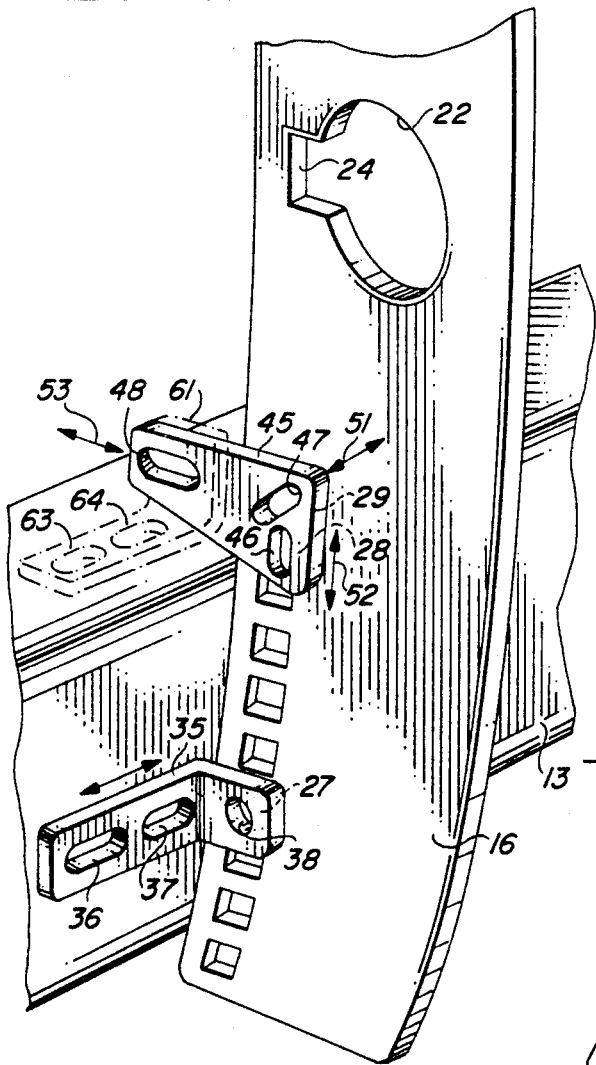
FIG-2
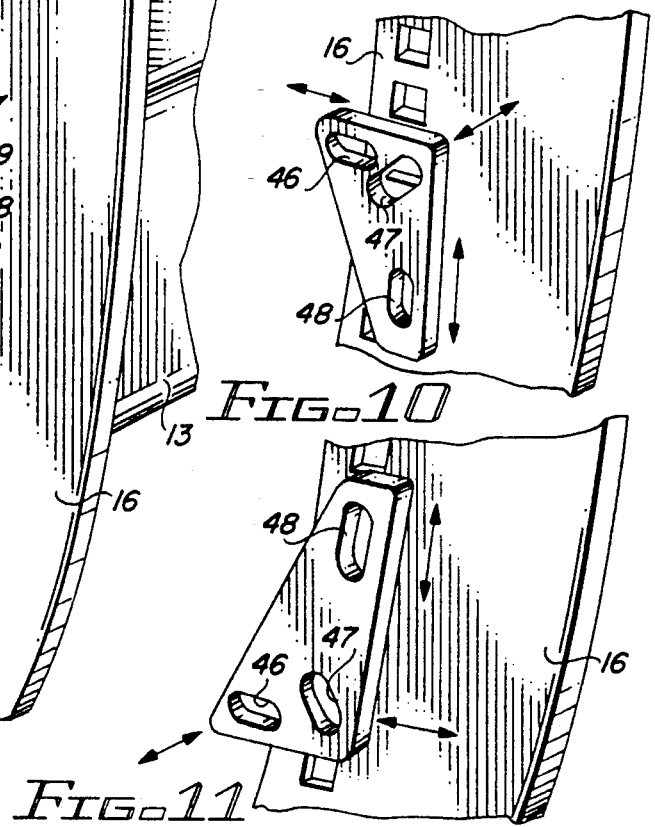
FIG-10
FIG-11

UNIVERSAL GRILL GUARD

BACKGROUND OF THE INVENTION

This invention relates to an automotive accessory and, in particular, to a grill guard that can be adapted to most, if not all, utility vehicles and light trucks.

Originally found on LAND ROVER type vehicles in wilderness areas, the grill guard was bolted or welded to the front of the vehicle to protect the radiator from tree branches and shrubs, or even an accidental encounter with a large animal, as the vehicle travelled "off-road" or across country where there were no roads. Grill guards became more widely used as four wheel drive vehicles became more popular and more accessible to the general public and as more people discovered "four-wheeling." Even for owners of two wheel drive vehicles, a grill guard adds a certain rugged look which many owners want their vehicles to have. A grill guard may serve in addition or instead as a platform for attaching a variety of other accessories, such as auxiliary lights, a small winch, a water bag, or a bug screen.

After-market suppliers have a problem trying to fit a grill guard to all of the different sizes and shapes of bumpers and grills on their customers, vehicles. Providing a large number of different kits is expensive for the supplier, requiring an inventory of a different kit for each vehicle. Providing a large number of adapters in each kit is wasteful and expensive for the customer. In addition, the customer may not install the guard properly if given too many parts from which to choose. Further, the guard must have a custom look, i.e. as though it were designed for the particular vehicle on which it is installed.

In view of the foregoing, it is therefore an object of the invention to provide a universal grill guard having a custom look.

A further object of the invention is to provide a strong, universal grill guard.

Another object of the invention is to provide a kit having as few parts as possible for assembly into a universal grill guard.

SUMMARY OF THE INVENTION

The foregoing objects are achieved in the invention wherein a grill guard includes a pair of vertical side plates, each having a pair of large holes near one end thereof, a pair of horizontal bars or tubes, four L-shaped brackets, two triangular plates, four dogs fitting within notches in the large holes for holding the tubes in place, and a plurality of bolts and nuts for fastening the members together.

Each side plate has a pair of large holes, longitudinally spaced at one end of the side plate and the cross tubes extend through respective ones of the holes in each side plate. Each side plate also has a plurality of spaced, smaller holes extending along one edge of the side plate away from the large holes. On each side plate, bolts are inserted into two or three of the smaller holes at spaced apart locations determined by the size and shape of the bumper to which the guard is attached. An L-shaped bracket is attached to the side plate by the lower bolt and a triangular plate is attached to the side plate by the upper bolt. The triangular plate has elongated holes to permit the bracket to rotate and to be raised and lowered slightly with respect to the bumper. A third bolt also secures the triangular plate to the side plate. The L-shaped bracket is attached to the front of the bumper. A second L-shaped bracket connects the triangular plate to the top of the bumper.

Each dog has a threaded hole and a boss around the hole. The sides of the dog have a narrowed or pinched portion for fitting within the notch in the large holes. The dog lies parallel to the tube and a bolt through the threaded hole is tightened against the tube to force the dog out of parallel alignment with the tube, forming a wedge between the tube and the side of the hole. The resultant wedging or pinching action holds the tube firmly in place. Since there are no notches or holes in the tubes, the spacing of the side plates is infinitely variable to accommodate grills of any width, up to the full length of the tube, and the tube has a smooth outer surface, giving a custom appearance.

BRIEF DESCRIPTION OF THE DRAWINGS

A more complete understanding of the invention can be obtained by considering the following detailed description in conjunction with the accompanying drawings in which:

FIG. 2 is a detail of the assembly of the grill guard of FIG. 1;

FIG. 7 is a cross-section of the side plate and dog; and

FIGS. 8-11 illustrate various orientations of the brackets to accommodate bumpers of different shapes.

DETAILED DESCRIPTION OF THE INVENTION

Figure 1:
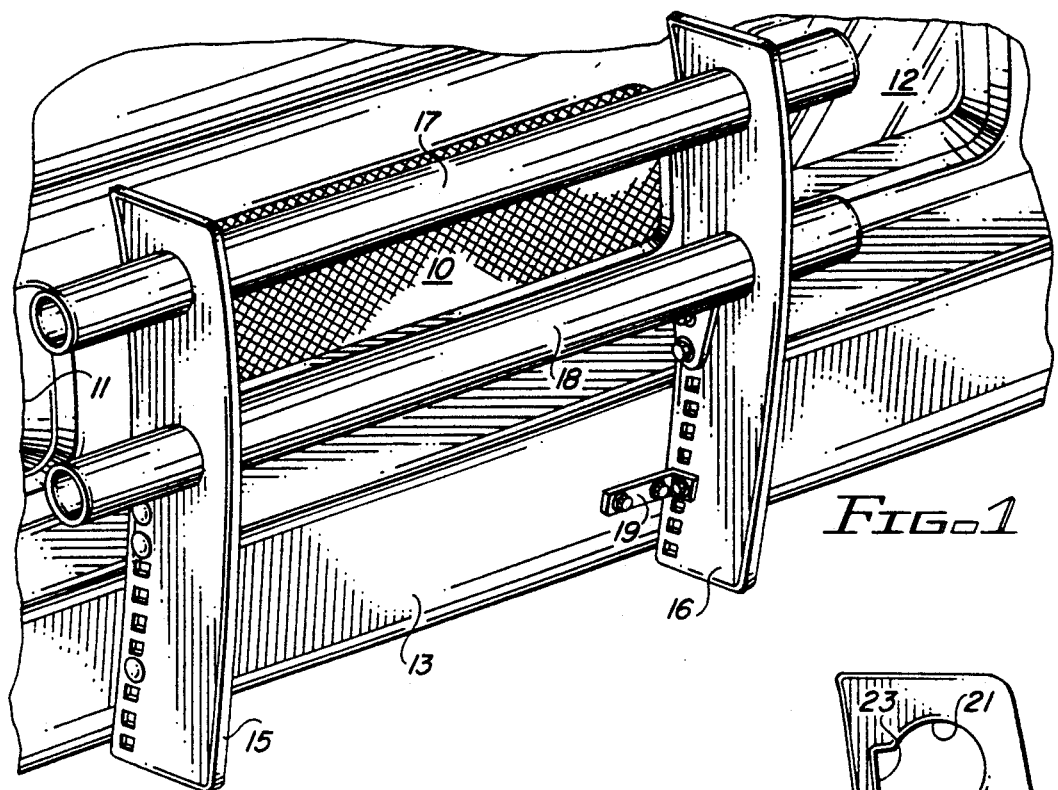
FIG. 1 illustrates a grill guard constructed in accordance with the invention and installed on the front of a vehicle.

FIG. 1 shows a grill framed by a grill guard having vertical side plates on either side of the grill and horizontal bars or tubes above and below the grill. Specifically, grill 10, located between headlamps 11 and 12, is protected by a grill guard connected to bumper 13. The grill guard includes side plates 15 and 16 and tubes 17 and 18. Side plates 15 and 16 are attached to the bumper by suitable brackets, such as bracket 19, and have a slight curve with the concave or rear edge facing the grill. Tubes 17 and 18 pass through large holes in the upper half of side plates 15 and 16 and are attached to the side plates by dogs, not shown in FIG. 1. Tubes 17 and 18 can have any desired length, up to the full width of the vehicle, and are separated from each other by a distance sufficient to avoid obstructing the beams from headlamps 11 and 12. The tubes also support side plates 15 and 16 in a spaced apart relationship.

Figure 5:
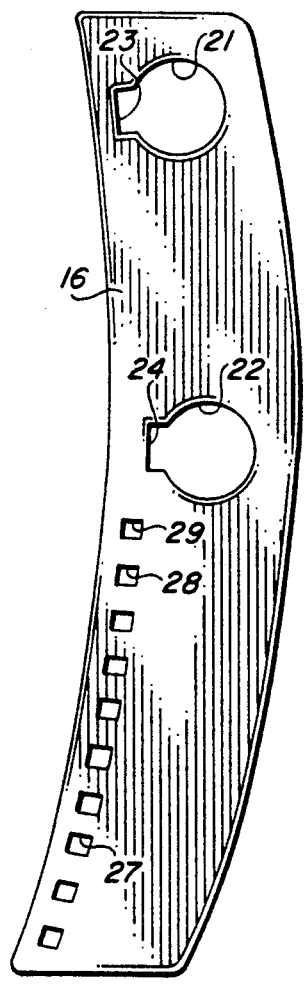
FIG. 5 is a plan view of the side plate.

FIG. 2 illustrates in detail the connection between bumper 13 and side plate 16. Side plate 16, also illustrated in FIG. 5, includes a pair of large holes 21 and 22, each including a notch toward the rear edge of side plate 16. Notch 23 in hole 21 and notch 24 in hole 22 receive a clamping means for holding the tube in place within the respective holes. Side plate 16 also includes a plurality of smaller holes, such as holes 27-29, along the rear edge of side plate 16 and extending away from holes 21 and 22. The smaller holes are preferable square for receiving the head of a carriage bolt.

Figure 3:
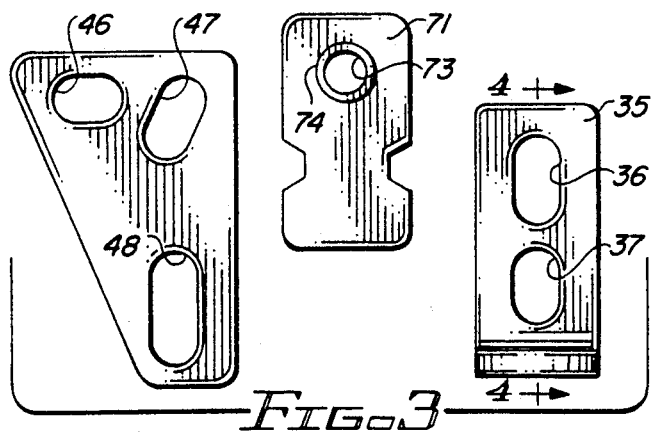
FIG. 3 illustrates a triangular plate, a dog, and an L-bracket used for attaching the side plate to a bumper.
Figures 4, 6:
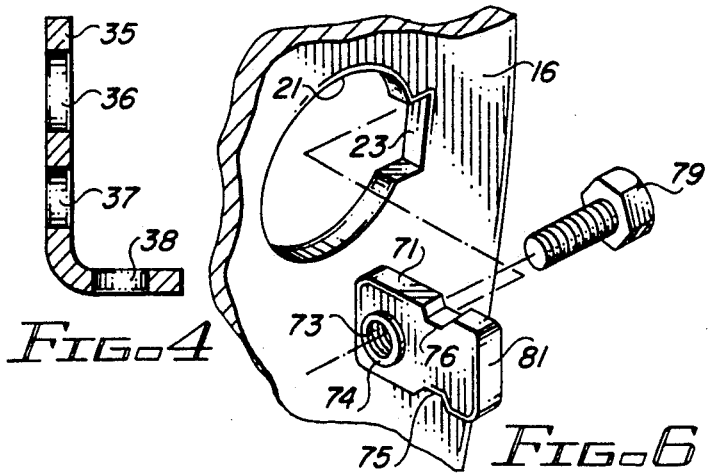
FIG. 4 is a cross-section of the L-bracket.
FIG. 6 illustrates the insertion of the dog into the side plate.

The lower portion of side plate 16 is attached to bumper 13 by L-shaped bracket 35, also illustrated in FIGS. 3 and 4. L-shaped bracket 36 includes elongated holes 35 and 37 for receiving a bolt through the lower portion of bumper 16. The elongation of holes 36 and 37 permits some side to side adjustment of side plate 16 for adjusting to the width of the grill or to enable one to use the existing bolts attaching the bumper to the frame of the vehicle. A bolt, not shown, through hole 29 and hole 38 fastens L-shaped bracket 35 to side plate 16.

At some distance above L-shaped bracket 35, determined by the height of the bumper, triangular plate 45 is attached to side plate 16 with a pair of carriage bolts, not shown, through holes 28 and 29. Triangular plate 45 includes elongated holes 46-48 which, taken in pairs, align with pairs of smaller holes along the rear edge of side plate 16. Holes 46-48 are elongated to permit some rotation and displacement of plate 45, as indicated by arrows 51-53. Holes 46-48 are located approximately at the corners of triangular plate 45 and are elongated in different directions from each other. Hole 46 permits movement in an up-down direction, as indicated by arrow 52; hole 47 permits movement in the direction indicated by arrow 51, rotating about a bolt through hole 46; and hole 48 permits movement in an forward and back direction, as indicated by arrow 53.

L-shaped bracket 61 is attached to triangular plate 45 by a bolt, not shown, through hole 48 in plate 45. L-shaped bracket 61 is identical to L-shaped bracket 35. While the foot of the L is illustrated as behind triangular plate 45, coplanar with side plate 16, L-shaped bracket 61 can be mounted in front of triangular plate 45, thereby moving holes 63 and 64 to the left, as illustrated in FIG. 2. L-shaped bracket 61 lies on top of bumper 13 and is preferably positioned to utilize one of the existing bolts which attaches bumper 13 to the vehicle.

Dog 71 (FIG. 3) is used for clamping the tubes within the larger holes in the side plates, as illustrated in FIGS. 6 and 7. Dog 71 comprises a rectangular, flat member having threaded hole 73 near one end and a reduced width portion near the other end formed by indentations 75 and 76 on opposite sides of the dog. Boss 74 surrounds hole 73 and provides additional threads for holding a bolt.

As illustrated in FIG. 6, dog 71 is inserted into hole 21 with indentations 75 and 76 engaging notch 23. Bolt 79 is threaded into hole 73 to engage tube 17, as illustrated in FIG. 7. Initially, dog 71 is approximately parallel with tube 17. As bolt 79 is tightened against tube 17, dog 71 is forced out of parallel alignment with tube 17, forcing end 81 toward the tube. This arrangement provides a wedge like structure for clamping tube 17 within hole 21 without requiring any structural features on the external surface of the tubes. This not only permits the spacing of side plates 15 and 16 to be infinitely variable but also provides a custom look to the grill guard. A dog is provided at each intersection of a tube and a side plate for securely holding the tubes to the side plates.

While a typical installation is illustrated in FIG. 2, it is understood that there is a wide variety of bumper shapes and sizes which can be accommodated by a guard constructed in accordance with the invention. For example, in FIG. 8, triangular plate 45 is flipped vertically from the orientation shown in FIG. 5, permitting plate 45 to rotate slightly about a bolt through hole 46. In FIG. 9, triangular plate 45 has been eliminated and replaced with L-shaped bracket 61. This combination is used for attaching the grill guard to a large bumper and permits one to attach side plate 16 close to the bumper.

As previously noted, triangular plate 45 has three holes, two of which will correspond to the smaller holes on the rear of the side plate. In FIGS. 2 and 8 for example, adjoining holes in side plate 16 are used for fastening plate 45. In FIG. 10, holes 47 and 48 align with alternate holes in side plate 16 to connect plate 45 to side plate 16. This configuration places the rear edge of side plate 16 closer to the surface of the bumper. FIG. 11 is an alternative embodiment of FIG. 10 in which hole 46 is moved down toward the lower end of side plate 16. While circumstances may require this configuration, in general it is preferred that the brackets attached to the bumper be spaced vertically as widely apart as possible to ensure the strongest possible connection.

A grill guard constructed in accordance with the invention included a side plate made of steel plate five sixteenths of an inch thick, having a width of four inches and a length of twenty-three inches. Large holes 21 and 22 were on eight inch centers and had a diameter of two and one half inches. The smaller holes were on one and one eighth inch centers and were one-half inch square. Tubes 17 and 18 had an outside diameter of two and one half inches, a wall thickness of 0.090 inch, and a length of forty-five inches. These dimensions are by way of example only. The steel can be chrome plated or painted flat black or other color.

In use, side plates 15 and 16 help protect the grill by pushing aside horizontal branches while tubes 17 and 18 protect the grill by deflecting vertical stems and branches. The invention thus provides a universal grill guard which is strong as installed, has a custom look, and uses as few parts as possible. In addition, the unused, smaller holes facilitate the attachment of other accessories, such as auxiliary lighting.

Having thus described the invention, it will be apparent to those of skill in the art that various modifications can be made within the scope of the invention. For example, while preferably made from steel, other materials or alloys can be used instead. The number and spacing of the holes is a matter of choice, provided that the larger holes are not so close together that the beams from the headlamps are obscured by the tubes. It is preferred that the spacing of the holes in the brackets correspond to the spacing of the smaller holes in the side plate, as described above, to provide the greatest adaptability in mounting the grill guard. Other spacings could be used, with a loss of this adaptability. The tubes can be open- or closed-ended, hollow, or filled to further resist denting or bending.

I claim:

1. A grill guard comprising:
   a pair of side plates each having a first hole near a first end thereof, a second hole spaced from the first hole, and a plurality of smaller holes along one edge of said side plate;
   a first tube extending through said first hole of each side plate;
   a second tube extending through said second hole of each side plate;
   means for fastening said first tube and said second tube to each of said side plates;
   a first pair of brackets connected near a second end of respective ones of said side plates for connecting said side plates to a bumper;

a second pair of brackets connected to respective ones of said pair of side plates at approximately the middle of said side plates; and a third pair of brackets, each connected to respective ones of said second pair of brackets, for connecting said side plates to an upper part of said bumper.

2. The grill guard as set forth in claim 1 wherein said fastening means includes a god wedged between said tube and said side plate in each of said first holes.

3. The grill guard as set forth in claim 1 wherein each of said smaller holes is square.

4. The grill guard as set forth in claim 1 wherein the brackets in said first and third pairs are L-shaped.

5. The grill guard as set forth in claim 4 wherein the brackets in said second pair are triangular.

6. The grill guard as set forth in claim 5 wherein each triangular plate has a hole near each corner thereof and said L-shaped brackets have a hole at each end.

7. The grill guard as set forth in claim 6 wherein at least some of the holes in said brackets are elongated.

8. The grill guard as set forth in claim 7 wherein all three holes in each triangular plate are elongated.

9. The grill guard as set forth in claim 8 wherein all three holes in each triangular plate are elongated in a different direction from each other.

10. The grill guard as set forth in claim 1 wherein said smaller holes are regularly spaced.

11. The grill guard as set forth in claim 10 wherein the holes in said triangular plates have a spacing corresponding to the spacing of said smaller holes.

12. A kit for assembly into a grill guard for a vehicle, the kit comprising:

a pair of side plates each having a first hole near one end, a second hole spaced from the first hole, and a plurality of smaller holes along one edge;

a pair of tubes for fitting within respective ones of said first and second holes;

four L-shaped brackets and two triangular plates for attaching said side plates to a bumper; and four dogs, fitting within respective ones of said first and second holes in addition to said tubes, for fastening said tubes to said side plates.

13. The kit as set forth in claim 12 wherein each dog includes a threaded hole and said kit includes four bolts fitting within said threaded holes.

14. The kit as set forth in claim 12 wherein said smaller holes are square.

15. The kit as set forth in claim 12 wherein said dogs each include a rectangular member having indentations in opposite sides thereof to form a narrow portion, said first and second holes each include a notch, and said narrow portion fits within said notch.

16. A vehicle having a grill guard for protecting the radiator of said vehicle, said grill guard comprising:

a pair of side plates each having a first hole near a first end thereof, a second hole spaced from the first hole, and a plurality of smaller holes along one edge of said side plate;

a first tube extending through said first hole of each side plate;

a second tube extending through said second hole of each side plate;

means for fastening said first tube and said second tube to each of said side plates;

a first pair of brackets connected near a second end of respective ones of said side plates for connecting said side plates to a bumper;

a second pair of brackets connected to respective ones of said pair of side plates at approximately the middle of said side plates; and a third pair of brackets, each connected to respective ones of said second pair of brackets, for connecting said side plates to the upper part of said bumper.

* * * * *